United States Patent
Woodruff et al.

(10) Patent No.: US 12,556,536 B1
(45) Date of Patent: Feb. 17, 2026

(54) TRANSPARENT CREDENTIAL PROXYING

(71) Applicant: Amazon Technologies, Inc., Reno, NV (US)

(72) Inventors: Eric Woodruff, Portland, OR (US); Ryan Hegar, Happy Valley, OR (US); Thomas Dytko, Portalnd, OR (US); Bryce Bristow, Beaverton, OR (US)

(73) Assignee: Amazon Technologies, Inc., Reno, NV (US)

( * ) Notice: Subject to any disclaimer, the term of this patent is extended or adjusted under 35 U.S.C. 154(b) by 310 days.

(21) Appl. No.: 17/697,794

(22) Filed: Mar. 17, 2022

(51) Int. Cl.
H04L 9/40 (2022.01)

(52) U.S. Cl.
CPC .............................. *H04L 63/0884* (2013.01)

(58) Field of Classification Search
CPC ............ H04L 63/0884; H04L 63/0815; H04L 63/0807
See application file for complete search history.

(56) References Cited

U.S. PATENT DOCUMENTS

| | | | | |
|---|---|---|---|---|
| 6,996,841 B2 * | 2/2006 | Kadyk | ................ | H04L 63/0823 713/150 |
| 7,113,994 B1 * | 9/2006 | Swift | ...................... | G06F 21/33 709/200 |
| 7,333,990 B1 * | 2/2008 | Thiagarajan | .......... | H04L 67/563 |
| 7,877,781 B2 * | 1/2011 | Lim | ........................ | H04L 63/10 726/1 |
| 7,958,347 B1 * | 6/2011 | Ferguson | ................ | H04L 9/321 726/8 |
| 8,219,802 B2 * | 7/2012 | Doleh | ..................... | G06F 21/41 713/168 |
| 8,327,428 B2 * | 12/2012 | Bailey | ..................... | G06F 21/31 713/168 |
| 8,452,882 B2 * | 5/2013 | Schneider | ............... | H04L 63/10 726/20 |
| 8,495,716 B1 * | 7/2013 | Newstadt | .............. | H04W 12/06 713/185 |
| 8,527,774 B2 * | 9/2013 | Fallows | .................. | H04L 67/02 713/168 |
| 8,700,892 B2 * | 4/2014 | Bollay | .................. | G06F 21/606 713/153 |
| 8,850,554 B2 * | 9/2014 | Otranen | ................ | H04L 63/105 726/8 |

(Continued)

*Primary Examiner* — David Garcia Cervetti
(74) *Attorney, Agent, or Firm* — Hogan Lovells US LLP

(57) ABSTRACT

An application in a remote environment can manage service-owned resources in a service environment. A two-way proxying mechanism can include a proxy agent in the remote environment and a service proxy endpoint in the service environment. When an application in the remote environment submits a call to the service environment, that request can be intercepted by the proxy agent and redirected to the service proxy endpoint. The service proxy endpoint, inside the service environment, can change the credentials of the request to the appropriate service credentials, perform scoping for the request, then redirect the request to the appropriate service endpoint. A corresponding response can be processed by the service proxy endpoint to remove service credentials, add credentials for the remote environment, then direct the request to the proxy agent, which can direct to the application to process the response without knowledge that proxying or request modification was performed.

20 Claims, 6 Drawing Sheets

(56) References Cited

U.S. PATENT DOCUMENTS

| | | | | |
|---|---|---|---|---|
| 8,996,857 | B1* | 3/2015 | Akella | G06F 21/41 |
| | | | | 713/153 |
| 9,154,488 | B2* | 10/2015 | Innes | H04L 63/0823 |
| 9,282,098 | B1* | 3/2016 | Hitchcock | H04L 67/56 |
| 9,483,627 | B1* | 11/2016 | Ferg | H04L 63/083 |
| 9,552,492 | B2* | 1/2017 | Kahol | H04L 67/56 |
| 9,553,867 | B2* | 1/2017 | Kahol | H04L 63/0281 |
| 9,866,545 | B2* | 1/2018 | Beecham | H04L 67/02 |
| 9,887,990 | B2* | 2/2018 | Pranam | H04L 63/102 |
| 10,009,773 | B2* | 6/2018 | Smith | H04W 12/086 |
| 10,079,834 | B2* | 9/2018 | Karunakaran | H04L 63/102 |
| 10,298,577 | B1* | 5/2019 | Aithal | G06F 9/45558 |
| 10,673,971 | B1* | 6/2020 | Hindanov | H04L 67/60 |
| 10,868,811 | B2* | 12/2020 | Kahol | H04L 63/0869 |
| 10,979,403 | B1* | 4/2021 | Mutescu | H04L 9/0631 |
| 10,986,504 | B1* | 4/2021 | Smith | H04W 12/068 |
| 2004/0068567 | A1* | 4/2004 | Moran | H04L 67/14 |
| | | | | 709/227 |
| 2006/0168221 | A1* | 7/2006 | Juhls | H04L 67/567 |
| | | | | 709/225 |
| 2007/0005964 | A1* | 1/2007 | Grosse | H04L 63/083 |
| | | | | 713/168 |
| 2007/0234041 | A1* | 10/2007 | Lakshmeshwar | H04L 9/0833 |
| | | | | 713/156 |
| 2007/0245414 | A1* | 10/2007 | Chan | H04L 9/3234 |
| | | | | 726/12 |
| 2008/0141339 | A1* | 6/2008 | Gomez | H04L 63/20 |
| | | | | 726/1 |
| 2008/0250388 | A1* | 10/2008 | Meyer | G06F 12/1466 |
| | | | | 717/106 |
| 2008/0288648 | A1* | 11/2008 | Schneider | H04L 67/56 |
| | | | | 709/229 |
| 2010/0281522 | A1* | 11/2010 | Hatakeyama | H04L 63/0823 |
| | | | | 726/4 |
| 2013/0247144 | A1* | 9/2013 | Marshall | G06F 21/335 |
| | | | | 726/1 |
| 2013/0291076 | A1* | 10/2013 | Duryee | H04L 63/0823 |
| | | | | 726/6 |
| 2014/0165178 | A1* | 6/2014 | Perrone, II | H04L 63/0892 |
| | | | | 726/5 |
| 2015/0007291 | A1* | 1/2015 | Miller | H04W 12/062 |
| | | | | 726/7 |
| 2015/0326550 | A1* | 11/2015 | Schropfer | H04L 63/08 |
| | | | | 726/7 |
| 2016/0044124 | A1* | 2/2016 | Sarukkai | H04L 43/0876 |
| | | | | 709/224 |
| 2016/0164863 | A1* | 6/2016 | Hitchcock | H04L 67/56 |
| | | | | 726/10 |
| 2016/0219044 | A1* | 7/2016 | Karunakaran | H04W 12/06 |
| 2016/0219060 | A1* | 7/2016 | Karunakaran | H04L 63/10 |
| 2016/0234209 | A1* | 8/2016 | Kahol | G06F 21/305 |
| 2016/0315930 | A1* | 10/2016 | Kim | G06F 21/41 |
| 2016/0337340 | A1* | 11/2016 | Walters | H04L 63/0272 |
| 2017/0289809 | A1* | 10/2017 | Smith | H04W 12/086 |
| 2017/0346804 | A1* | 11/2017 | Beecham | H04L 9/3236 |
| 2018/0103009 | A1* | 4/2018 | Eberlein | H04L 63/029 |
| 2018/0145830 | A1* | 5/2018 | Henretty | H04L 9/3263 |
| 2018/0267847 | A1* | 9/2018 | Smith | H04L 67/141 |
| 2018/0324172 | A1* | 11/2018 | Unnikrishnan | H04L 63/102 |
| 2018/0351960 | A1* | 12/2018 | Karunakaran | H04L 63/102 |
| 2019/0007409 | A1* | 1/2019 | Totale | H04L 9/3247 |
| 2019/0182250 | A1* | 6/2019 | Kiester | H04L 63/0428 |
| 2020/0125700 | A1* | 4/2020 | Chang | G06F 21/6218 |
| 2020/0204594 | A1* | 6/2020 | Rajagopal | H04L 63/1433 |
| 2020/0259817 | A1* | 8/2020 | Natarajan | H04L 63/0281 |
| 2022/0100902 | A1* | 3/2022 | Juniper | H04L 63/0281 |
| 2022/0103579 | A1* | 3/2022 | Shi | H04L 63/0281 |
| 2022/0368766 | A1* | 11/2022 | Locketz | H04L 63/0869 |
| 2023/0056432 | A1* | 2/2023 | Wu | H04W 12/0431 |
| 2023/0208654 | A1* | 6/2023 | Chao | H04L 9/3268 |
| | | | | 713/156 |
| 2023/0224259 | A1* | 7/2023 | Zhang | H04L 67/563 |
| | | | | 709/226 |
| 2024/0080313 | A1* | 3/2024 | Parla | H04L 67/14 |
| 2024/0171555 | A1* | 5/2024 | Chen | H04L 63/166 |

* cited by examiner

TRANSPARENT CREDENTIAL PROXYING

BACKGROUND

Many computer-based applications and services are supported using cloud resources, or computer resources offered by a resource provider that are available for communication across a network. In many instances, users want to be able to manage cloud and hybrid resources from a single cloud service, as well as to have the capability and simplicity of managed services be extended to their local network. Existing services that normally run in a cloud service context can have access to service-owned credentials for performing respective tasks in the service account to ultimately provide a service interface, such as a service application programming interface (API) to users. However, when deploying service software applications directly to a user or remote environment, that software is typically prevented from having access to service-owned credentials. Nevertheless, the service application that is managed for a user still needs to be able to access service-owned resources on behalf of the user using the API to deploy the application to their environment, to perform tasks such as to publish internal logs to a service owned endpoint.

BRIEF DESCRIPTION OF THE DRAWINGS

Various embodiments in accordance with the present disclosure will be described with reference to the drawings, in which.

DETAILED DESCRIPTION

Approaches described and suggested herein relate to the deployment and management of services and resources to separate environments with different security mechanisms in place. This can include, for example, enabling an application in a remote environment to access and manage aspects of a service or resource in a service environment, even though the service environment utilizes security credentials, and other information, that is not permitted to be provided to the remote environment. In order to enable such functionality for an application, without significant modifications to the application, a proxying approach can be utilized that may be transparent to the application, but that enables the application to submit targeted requests into the secure service environment. In one embodiment, a customer proxy agent can be deployed in a customer environment that is able to intercept and redirect requests from a customer application to a service endpoint in a service environment. The requests can be redirected, under customer signature or credentials, to a service proxy in the service environment. The service proxy can remove the customer credentials, apply the appropriate service credentials for the service environment, and redirect this modified request to the appropriate endpoint. The service proxy can also be responsible for ensuring proper scoping and access for the request as part of the credential verification process. When a response is generated, the response can be processed by the service proxy to remove any service credentials and cause the response to be directed to the customer proxy agent. When the response is received to the proxy agent in the customer environment, the proxy agent can direct the response to the client service application, which can process the response as if it had been received from the service endpoint with no intermediate proxying. Similar proxying functionality can be used for long-running connections or other communications as well.

Various other such functions can be used as well within the scope of the various embodiments as would be apparent to one of ordinary skill in the art in light of the teachings and suggestions contained herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
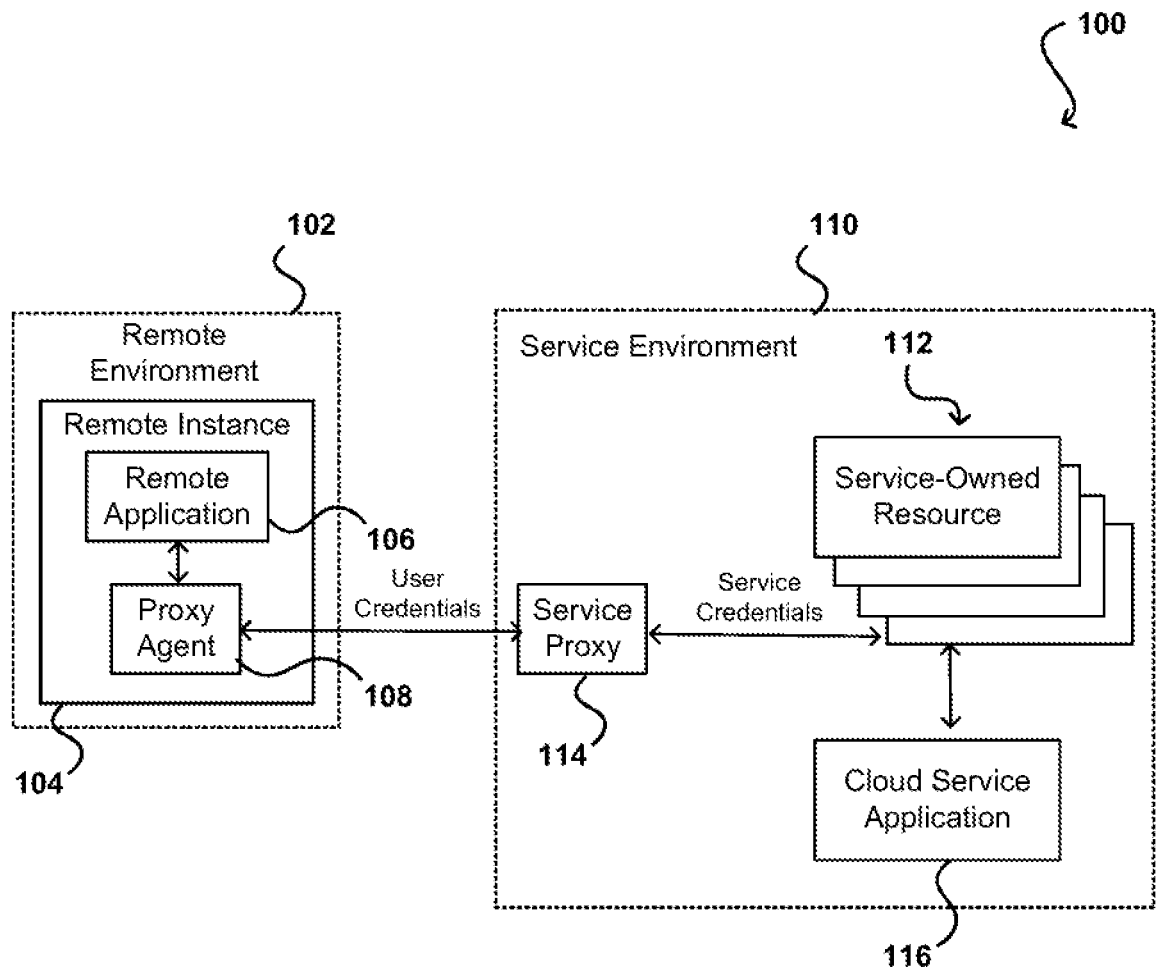
FIG. 1 illustrates an example system for enabling secure communications between a service environment and a customer environment that can be utilized in accordance with various embodiments.

FIG. 1 illustrates an example system 100 that can be used to provide and manage applications and services that are at least partially cloud based, or supported by one or more resources in a remote computing environment, in accordance with various embodiments. In this example, a cloud service application 116 can be hosted using one or more computer resources of a service environment 110. These computer resources can include hardware, software, and/or firmware, such as may include one or more servers or server instances, which may be physical or virtual instances, such as virtual machines. This cloud service application 116 may communicate with a remote application 106 installed and executing on a remote computing device or component, such as a remote computer, server, or server instance, where this remote instance 104 is provided as part of a remote environment 102 that can be logically and/or geographically separate from a service environment, and may be operated by a different entity than a provider of this service environment 110. This may include, for example, a remote instance 104 running on a server in a data center that is operated by a customer of a resource provider who provides the service-owned resources 112 of the service environment 110. During operation of the application, the remote application 106 can communicate with the cloud service application 116 for various management and other tasks. There may be at least some functionality of the remote application that is provided by other hardware or software resources in the remote environment, and some functionality that is to be provided by one or more service-owned resources 112 in the service environment. In at least some embodiments, there may also be resources that are considered hybrid resources, where some of the functionality is provided from the service environment and some of the functionality is provided from the remote environment.

As mentioned, a user, manager, or other entity utilizing the remote application 106 may want to be able to manage these service-owned, or "cloud" resources, as well as any hybrid resources, from a single cloud service or interface. Such an entity may also want the capability and simplicity of managed services extended to be extended to their local network, in this case including resources in the remote environment 102. A cloud service application 116 or cloud based service may execute in a cloud service context within the service environment. A cloud service application 116 may have access to one or more service-owned credentials, which can provide that application with access to one or secure resources within this service environment 110. Access granted using one of these service-owned credentials can be used to perform respective tasks in a service account, such as to provide a service interface (e.g., an API) to one or more users or entities associated with the remote application 106. A remote service software application 106 deployed directly to a remote environment, such as a user or customer environment, may be prevented from having access to these service-owned credentials, at least to provide a desired level of security for associated service-owned resources in the service environment 110. The remote service application 106 that is managed for the user will still, in many cases, need to be able to access service-owned resources 112 on behalf of a user utilizing an appropriate API, or other such interface, to deploy the remote service application 106 to their remote environment 102.

Approaches in accordance with various embodiments can provide such a remote service application 106 to access service-owned resources through a proprietary service-owned endpoint. This can be provided using a proxy-based approach, with few or no significant changes needed to be made to the remote application 106 in at least many instances. Such a proxying mechanism can be used to provide for transparent credential proxying for running services on-premises for an entity, such as in a remote environment 102. Such an approach can be used to enable cloud-based services, such as MediaLive and MediaConnect from Amazon.com, Inc., to extend their services to on-premises data centers operated by customers or other entities associated with those services. Such an approach can enable these cloud and hybrid resources to be managed from a single cloud service, with the capability and simplicity of managed services extended to this remote network 102.

As illustrated in the system architecture 100 of FIG. 1, an example implementation can include a remote application 106 deployed to a remote instance (or other computing resource) of a remote environment 102, such as a customer data center. In this example, the remote application 106 can send communications that are intended for one or more service-owned resources 112 in a service environment 110. The remote instance, or other component in this remote environment 102, can host a proxy agent 108 that can be configured to intercept these communications from the remote service application 106 before they exit the remote environment 102. The proxy agent 108 in the remote environment can re-direct these communications to a service proxy 114 in the service environment 110. In this example, the service proxy 114 can be a Web service that has an endpoint accessible to a remote environment, that also has access to service credentials and can manage and redirect requests on behalf of resources in the service environment. The communications between the proxy agent 108 and the service proxy 114 can be signed by user credentials, or other credentials associated with the remote application 106 in the remote environment 102. These communications can include individual requests and responses, as well as long-running sessions that may include multiple messages over an open connection over a period of time. In at least one embodiment, a proxy agent 108 may be able to direct the request to multiple service proxies, as may be in the same or different service environments, and can also determine routing for a request received from a remote application where there may be more than one service proxy available to receive different types of requests, as may be associated with different roles or customer accounts.

In a request and response scenario, a remote application 106 can create and transmit a request, which can be received to, or intercepted by, a local application proxy agent 108. This proxy agent 108 can then redirect this request to a service proxy endpoint 114 in the service environment 110. In at least this example, it can be important for the service proxy endpoint to be inside the service environment, or at least in a trusted location associated with the service environment, such that one or more local credentials for the service environment 110 can be available. The proxy agent 108 can perform a number of different tasks with respect to the request before any redirection. This can include, for example, determining whether the request requires a signature, which in this case would involve one or more user credentials, or credentials available within the remote environment 102 and associated with the remote application 106, or a user or entity associated with the remote application 106. If so, the proxy agent 108 can re-sign the request for the new service endpoint using local credentials. The proxy agent 108 can then map the original request host and path to new headers, and can forward the request to the service proxy endpoint 114. When a response is received, the proxy agent 108 can return that response to the remote application 106.

In the service environment, a service proxy endpoint 114 can receive a request, sent by the remote application 106 and redirected by the proxy agent 108. The service proxy 114 can authenticate and/or authorize the user or entity associated with the request using the appropriate credentials. If authenticated and authorized, the request can be validated and can be filtered using, for example, endpoints on an "Allow" or similar list or designation, as well as potentially other similar properties. The service proxy 114 can then resign the request headers of this message, such as by utilizing one or more service credentials that are scoped down for the relevant service and are associated with a limited access role. In some embodiments, the service proxy can further limit or augment the provided credentials based on other factors as well, such as a user-agent identifier to provide different behavior and/or access to different parts of the application. The service proxy 114 can forward this reworked request to a "real" or target endpoint in the service environment 110, as may be associated with a service-owned resource.

If a response is received to the service proxy 114, the service proxy 114 can also augment any received response data to map these service-owned resources to one or more customer resource identifiers, or other resources in the remote environment 102. The service proxy 114 can also filter out or block any sensitive data in the response, as may relate to one or more service credentials, and can return the response to the proxy agent 108 in the remote environment, which can adapt and provide to the remote application as discussed above.

As mentioned, requests and responses may also be transmitted on an open or long-lived session. In such a scenario, a communication connection can remain open for at least a determined period of time, and a cloud service can forward asynchronous messages back through the service proxy 114 and proxy agent 108 to the remote application, in at least some embodiments as one or more "push" messages. The service proxy endpoint 114 can maintain two open connections to pass messages back and forth between the proxy agent 108 and the real endpoint associated with a service-owned resource 112. The remote application 106 can then behave as if it is logically and indirectly communicating with the cloud service application 116 and the service-owned resources 112, and able to manage those resources as if the remote application 106 were local in the service environment.

Figure 2:
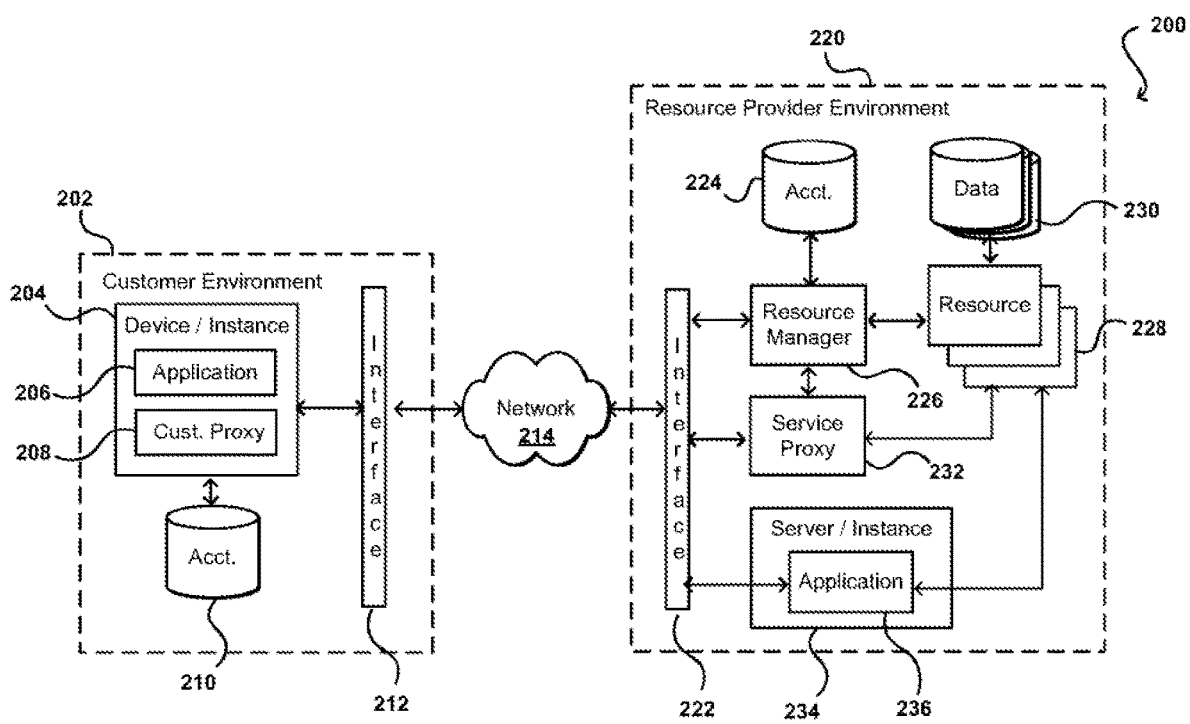
FIG. 2 illustrates an example system for enabling an application in a customer environment to access resources in a resource provider environment, in accordance with various embodiments.

Such an approach can be used with a variety of different cloud based applications and services, such as may relate to live video encoding and live video transport. FIG. 2 illustrates an example system 200 that can be used to implement such functionality in accordance with various embodiments. In this example, a customer environment 202 functions similar to that of remote the environment of FIG. 1, which in this example utilizes resources in a resource provider environment 220 in which resources 228 can be used to support one or more cloud-based services or other such offerings. Instead of an entity purchasing and maintaining a large number of rack-mounted servers for such purposes to be operated in a local customer environment 202, such an entity can utilize approaches such as those presented herein to execute applications locally on servers, or server instances 204, which can take advantage of at least some amount of hardware and software that is located elsewhere, such as cloud offerings presented using shared or multi-tenant computing resources 228 offered from a resource provider environment 220, such as is illustrated in FIG. 2. An entity, which can be a customer of a resource provider associated with the resource provider environment 220, can utilize one or more cloud instances as part of a fully-managed solution. A customer can obtain a unified experience, where a customer can manage everything from a single console, such as a cloud-based console. In some systems, this can involve deploying at least some cloud service software or applications 206, which would previously have executed on a computing resource 228 of the resource provider environment, to a server, or other device or instance 204, in a customer environment 202, such as a customer-owned, on-premises data center. These local instances 204 can be registered and associated with one or more cloud services offered by a resource provider. In some embodiments, a single management API can be exposed that can provide for service management, which can involve resources in both the customer environment 202 and the resource provider environment 220.

An example environment 200 such as that illustrated in FIG. 2 can be used in some embodiments to provide resource capacity for one or more users, or customers of a resource provider, as part of a shared or multi-tenant resource environment. In this example a user is able to utilize a client device 204 to submit requests across at least one network 214 to a multi-tenant resource provider environment 220, also referred to herein as a service environment when at least some of those resources are used to support or provide one or more cloud services, or remote network-based services. The client device or instance 204 can include any appropriate electronic device operable to send and receive requests, messages, or other such information over an appropriate network and convey information back to a user of the device. Examples of such client devices include personal computers, tablet computers, smart phones, notebook computers, servers, server instances, and the like. The at least one network 214 can include any appropriate network, including an intranet, the Internet, a cellular network, a local area network (LAN), or any other such network or combination, and communication over the network can be enabled via wired and/or wireless connections. The resource provider environment 220 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 220 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 228 of one or more types. These types can include, for example, application servers operable to process instructions provided by a user or database servers operable to process data stored in one or more data stores 230 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 228 can submit a request that is received to an interface layer 222 of the provider environment 220. The interface layer can include application programming interfaces (APIs) or other exposed interfaces enabling a user to submit requests to the provider environment. The interface layer 222 in this example can also include other components as well, such as at least one Web server, routing components, load balancers, and the like. When a request to provision a resource is received to the interface layer 222, as may be sent from a corresponding interface layer 212 of the customer environment 220, information for the request can be directed to a resource manager 226 or other such system, service, or component configured to manage user accounts and information, resource provisioning and usage, and other such aspects. A resource manager 226 receiving the request can perform tasks such as to authenticate an identity of the user submitting the request, as well as to determine whether that user has an existing account with the resource provider, where the account data may be stored in at least one data store 224 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 204 to communicate with an allocated resource without having to communicate with the resource manager 226, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 226 (or another such system or service) in this example can also function as a virtual layer of hardware and software components that handles control functions in addition to management actions, as may include provisioning, scaling, replication, etc. The resource manager can utilize dedicated APIs in the interface layer 222, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 222 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Such a system can allow a cloud application to be deployed to a customer environment with minimal changes, if any, needed to the application 206 itself. Any changes may be limited to dependencies and assumptions appropriate for a different operating environment. In some embodiments, the software application 206 may be containerized, such as where the application, supporting code and dependencies, system tools, system binaries, and software are all deployed within a container, such as a Docker container, that allows that application to be executed reliably in different computing environments. A system such as those described with respect to FIGS. 1 and 2 can also "hide" the details of configuring and managing and running the software from the end users, or can essentially automatically configure and manage without required input, or at least without substantial input, from an end user or system administrator for resources in the customer environment 202. Such a system can also enable a cloud application 236 or service executing on a cloud server or instance 234 to be able to obtain information needed for such management on behalf of various customers and customer accounts, as may include information such as service logs, performance metrics, and debugging information. Such an approach can enable this information to be provided in a secure way, which protects access to internal cloud resources 228 in the resource provider environment 220. As discussed previously, this can be accomplished at least in part by using a two-way proxy mechanism, which includes a customer proxy 208 in the customer environment and a service proxy 232, or proxy endpoint, in the resource provider environment 220, so that none of the service access credentials are needed within the customer environment 202, and are not passed to the customer environment.

A customer proxy 208 installed to a customer instance 204 in a customer environment can take the form of customer agent that works with a cloud service offering. In one example, this can be an Elastic Container Service (ECS) agent of an ECS offering, from Amazon.com, Inc., where the customer instance 204 is registered to an ECS instance cluster in a customer account, and can access using credentials or other information stored locally in a database 210 or other such location. The customer proxy 208, which can have been deployed to the customer instance 204 within a container that included the service application 206, can then intercept any requests from the service application 206 that is intended to an endpoint in the resource provider environment 220 that is related to the ECS, an AWS service, or another cloud service. As mentioned, the customer proxy 208 can reroute these requests over an appropriate network 214 to a target endpoint in the resource provider environment, as may take the form of a service proxy endpoint 232. The service proxy 232 can then perform one or more tasks with respect to the request, now that the request is within the resource provider environment. This can include, for example, secure validation on a request, as well as to update and manage a list as to which access should always be granted or authorized, and which access should be blocked or always denied. Access can be blocked when a resource or application in a customer environment 202, for example, is attempting to access a resource 228 in a resource provider environment 220 that is outside of a scope of access granted or permitted under the terms of the relevant account with the resource provider. In at least one embodiment, any request, or at least specific types of requests, submitted by a local application 206 in the customer environment 202 for a cloud resource 228 can be intercepted by the customer proxy 208, redirected to a service proxy 232 in the resource provider environment 220, and then modified or processed by the service proxy, or an application or service in communication with the service proxy 232. In this example, the redirected request can be received to an interface or API of the interface layer 222 and directed to the service proxy 232. The service proxy can perform various validation or authentication tasks as discussed herein, as well as other request modification, and can re-sign that request using one or more cloud service credentials, or other credentials associated with the resource provider environment 220 or cloud service application 236. These credentials can be used in any appropriate manner, such as to sign with a digital certificate or encrypt using an asymmetric key, among other such options. In any of these options, however, at least one of the credentials used can be specific to, and not allowed out of, the resource provider environment 220. Such an approach can enable service-managed resources 228 to be operated, at least in part, from an application running in a customer environment, but without exposing service-related security credentials outside the resource provider environment 220.

In at least one embodiment, such a proxying approach can function as a type of firewall, preventing credentials or other types of sensitive data or information from passing outside a protected environment, such as the resource provider environment 220. In this example, the proxying approach includes two-way proxying, involving a local component and a remote component. This can include a customer proxy agent 208 in the customer environment 202, which may take the form of an application with at least one API, or other interface, that is able receive requests from the customer application 206 and redirect those requests to a service proxy endpoint 232 in the resource provider environment 220. The service proxy endpoint 232 can then perform tasks such as to introspect those requests, modify as appropriate, then forward on the final or intended service endpoint, as may be associated with a cloud resource 228 in this resource provider environment 220. The service proxy endpoint can also perform any required secure isolation to limit the resources that can be accessed on behalf of that customer, as a per-customer request coming in, which can enable the customer application 206 to access the appropriate resources, while preventing access to other resources or services in the resource provider environment. Similarly, when a response is transmitted, this response can be received or intercepted by the service proxy 232 and reformatted or otherwise processed to send to the customer proxy 208, such that the response when sent will not include any credentials or other security tokens or mechanisms that are not to be transmitted outside the resource provider environment 220, or at least not to be transmitted to the customer environment 202. The customer proxy 208 can then redirect this response to the customer application 206, such that the customer application receives the expected response and may have no knowledge that any proxying was performed with respect to the request or response. In at least some embodiments, this can be accomplished without any modifications to the customer application 206, but instead through updating of configuration information in the customer environment 202 (and potentially the resource provider environment 220), to provide for this redirection and interception by the customer proxy 208.

In one example, an instance of a customer proxy 208 can register itself with a component on the service side. The proxy agent can receive a request intended for a registration endpoint of the public service hosted on the service side. The request can be signed using the local end user credentials that are on the device or instance 204 in the customer environment, such as in their data center. The signed request can be signed with a certificate associated with that client, and that request can be encrypted using, for example, transport layer security (TLS) encryption. The signed request can then be transmitted to a proxy component running in the resource provider environment 220, or service environment, such that the service proxy can receive the full request. The message that is intercepted by the customer proxy 208 can leave the data in the body of the request untouched, or significantly unmodified, and can primarily modify the targeted endpoint (e.g., an address for a webserver) to instead be directed to the service proxy endpoint. The modified request can be re-signed by the customer proxy, with the new role information, using the same customer credentials. The modified request can then be transmitted to a service-owned endpoint, such as a service proxy endpoint 232, which can utilize information in those requests to cause the instance to be registered with the service. The service endpoint can analyze information such as user agent headers to determine which agent is making the calls or transmitting the requests, such that the service proxy (or related service component) can perform appropriate credential scoping and access determinations. A management level agent running on the customer device 204 can then receive one view of credential access, while related service components in the service environment have a different view.

In some embodiments, at least some amount of mapping may be performed to cause the body of the response to talk about resources that are relevant to the customer service application 206 and/or resources in the customer environment 202. Other inspections or modifications can be performed as well as discussed and suggested elsewhere herein, such as to deny listing of any resources that are not to be exposed to the customer. As an example, a service provider may attempt to ensure that no service-sensitive credentials are included in any response back to a caller from outside a service environment, so any response coming back from a service, which might include some role credentials related to a task that is intended to be run, can have any such credentials stripped out before being transmitted outside the environment. The customer application can receive a response, redirected by the proxy agent 232, that appears as if it came directly from a service endpoint, with no intervening proxy, and can determine that instance registration was successful instance registration. In this example, a customer proxy agent 208 can interface with multiple services in the service environment, but is specific to a client application 206 and corresponding credential scope. Each instance in a service environment may also have its own service proxy with a corresponding credential scope.

In at least some embodiments, a customer proxy agent 208 in a customer environment 202 can be at least somewhat universal in that all requests and responses for a customer service application can be configured to come through that customer proxy agent. The agent can analyze a request to determine if it matches a list of services that it should proxy for, and if so can perform any modification and redirection necessary or appropriate, as discussed herein. If, however, the request does not match one of these services, such as where it is a request for a third party system, then the proxy can allow that request to pass through to that system endpoint unmodified, unfiltered, and without redirection. In some embodiments, this proxy may be configured to perform some filtering or other processing of any or all requests, regardless of whether they are associated with a listed service or service endpoint.

As mentioned, communications may also be sent on a long-running session. There may be individual links or hops to this connection, and these connections may each be long-running connections that are kept open for a period of time to allow for asynchronous two-way messaging. Similar functionality can be applied, wherein credentials are swapped and requests and responses modified to allow for communication between environments, such as a customer environment and a resource provider environment, with proper access scoping and without passing protected credentials or other sensitive information out of a respective environment.

Figure 3:
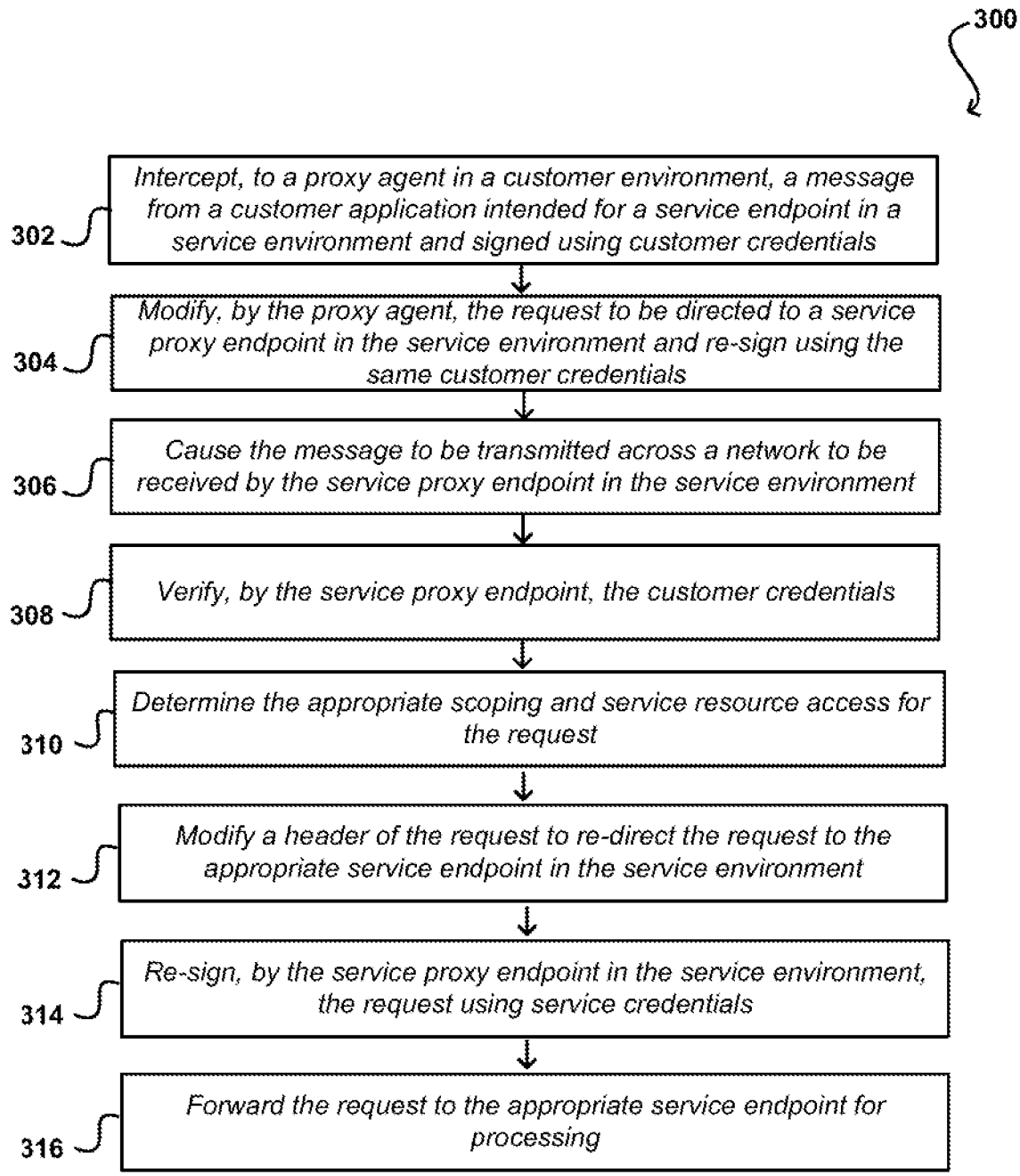
FIG. 3 illustrates an example process for enabling a request to be transmitted from an endpoint in a customer environment to an endpoint in a service environment in accordance with various embodiments.

FIG. 3 illustrates an example process 300 for proxying a request from a customer environment to a service environment that can be performed in accordance with various embodiments. It should be understood that for this and other processes presented herein that there can be additional, fewer, or alternative steps performed in similar or alternative orders, or at least partially in parallel, within the scope of the various embodiments unless otherwise specifically stated. In this example process, a customer application executing in a customer environment can generate a request to be transmitted to a target endpoint in a service environment, such as where one or more resources are requested to perform one or more tasks on behalf of the customer application. This message from the customer application can be intercepted 302 by, or otherwise received to, a proxy agent executing in the customer environment. The message can be signed using one or more customer credentials. The proxy agent can, at least for a message intended for an endpoint associated with the service environment, modify 304 the request to be direct to a service proxy endpoint in the service environment, and can cause the request to be re-signed using the same customer credentials. In this way, the request can be essentially unchanged, other than being directed to a proxy endpoint other than a service endpoint. The message can then be caused 306 to be transmitted across at least one network to be received by the service proxy endpoint in the service environment. The service proxy endpoint can verify 308 the customer credentials, and based at least in part upon information for the verified customer can determine 310 the appropriate scoping and service resource access to be granted or permitted for the request. A header of this request can be modified 312 to re-direct the request to the appropriate service endpoint. In some embodiments, at least some other modifications to the request can be made, such as to adjust or determine one or more mappings of resources indicated in the request, where some of that information is not to be shared outside the service environment. The service proxy endpoint can then re-sign 314 the request using one or more service credentials that are not to be distributed outside the service environment, or at least not to be shared with the customer application in the customer environment. The request can then be forwarded 316 to the appropriate service endpoint in the service environment for processing.

Figure 4:
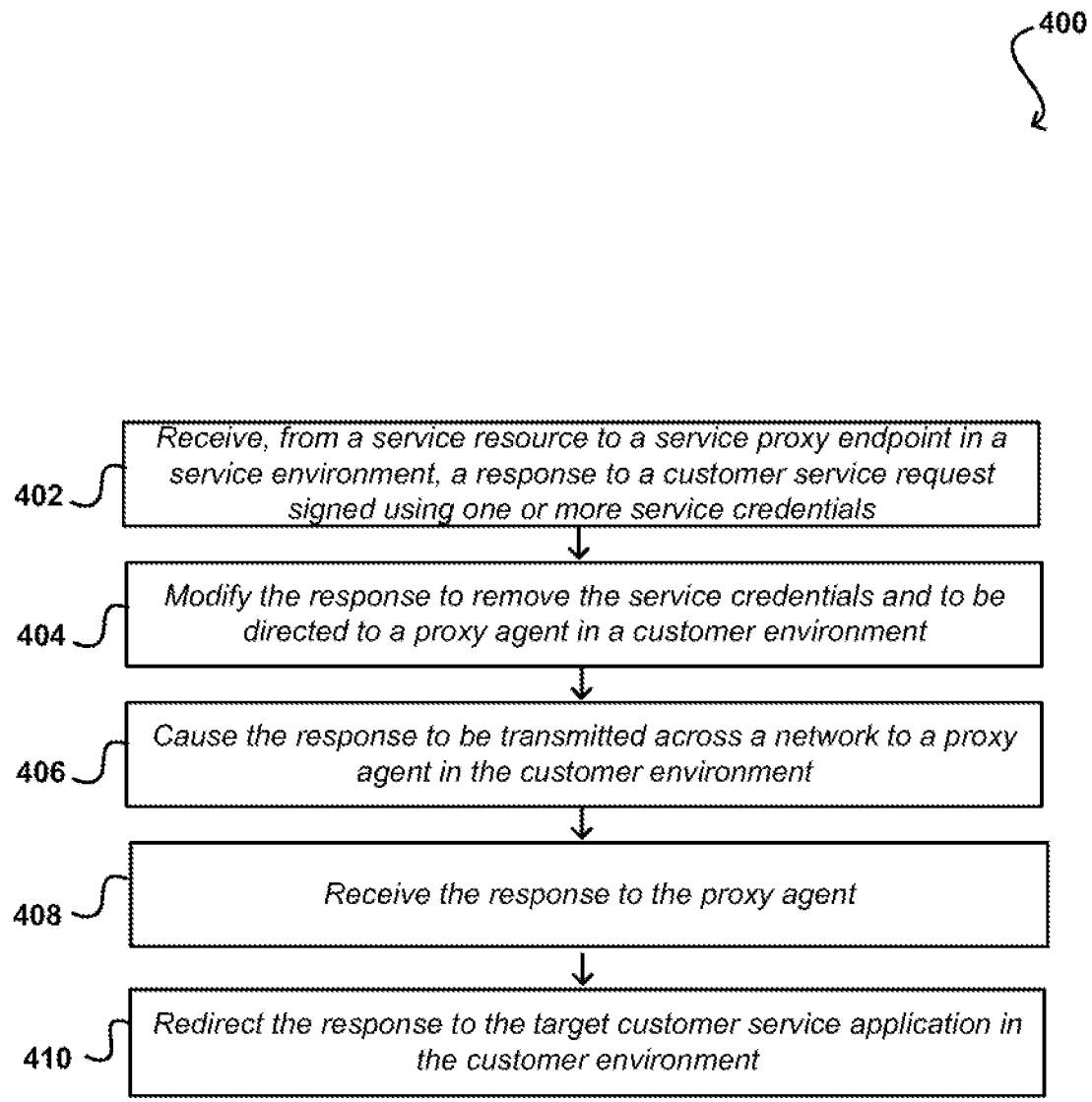
FIG. 4 illustrates an example process for enabling a response to be transmitted from an endpoint in a service environment to an endpoint in a customer environment in accordance with various embodiments.

FIG. 4 illustrates an example process 400 for proxying a response from a service environment to a customer environment that can be performed in accordance with various embodiments. This response may be sent after processing performed by a service or resource in the service environment in response to a request from an application in the customer environment, such as is described with respect to the process 300 of FIG. 3. In this example, a response is received 402 from a service resource to a service proxy endpoint in a service environment, where the response is in response to a customer service request and is signed using one or more service credentials. The response can be modified 404 to remove the service credentials and to be re-directed to a proxy agent in a customer environment. Any mapping performed for the corresponding request can be applied to this response in order to prevent revealing any protected information in the response. In some embodiments, some amount of encryption or securing of this response may be performed before transmission. The response can then be caused 406 to be transmitted across a network to a proxy agent in the customer environment. The response can be received 408 to the proxy agent, which can perform any necessary decryption, transforming, decoding, or other such processing. The response can then be redirected 410 to the target customer application in the customer environment, which can process the response as if the response were received from the service endpoint without any intermediate proxying.

Figure 5:
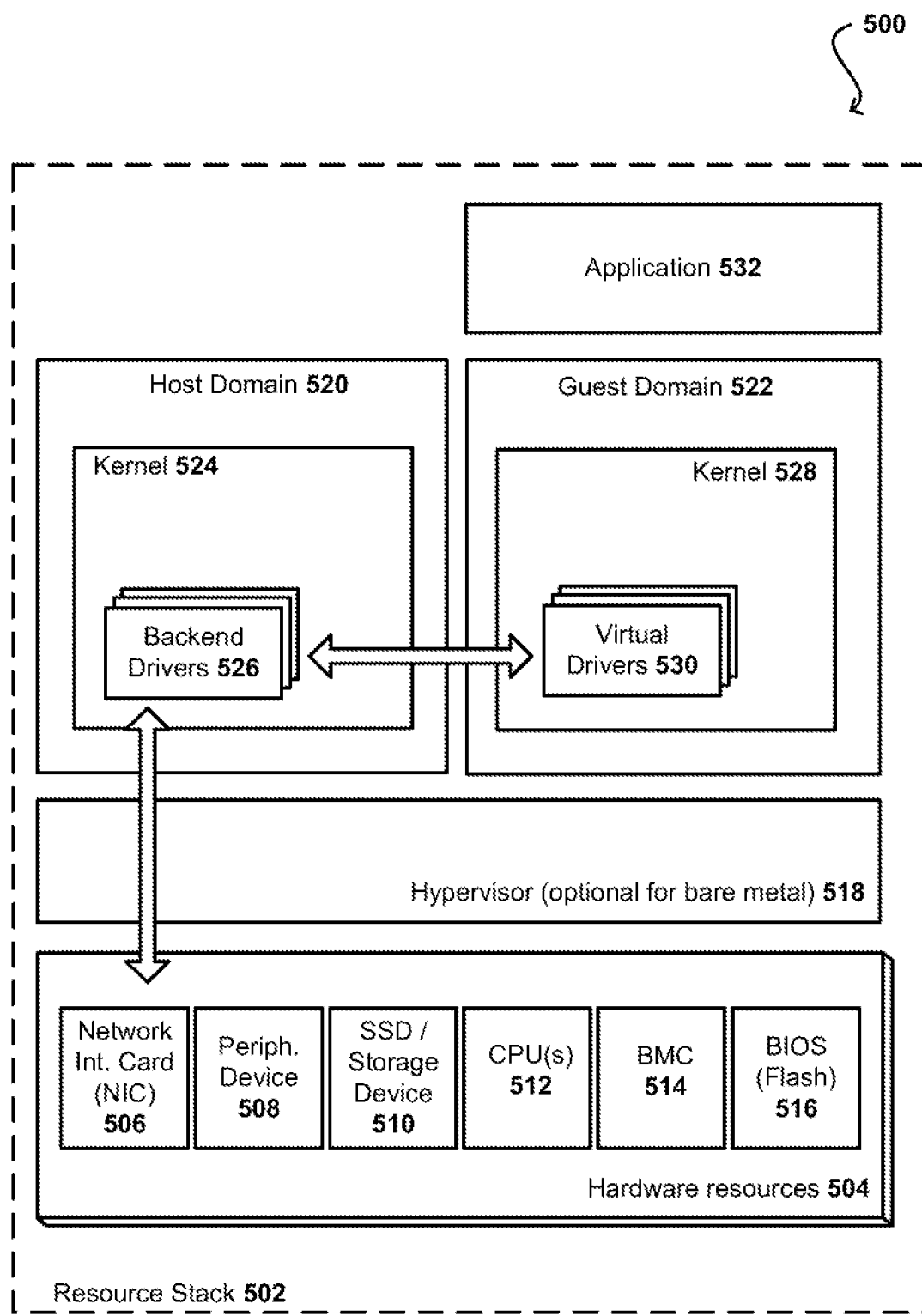
FIG. 5 illustrates components of an example virtualized environment that can be utilized in accordance with various embodiments.

FIG. 5 illustrates an example resource stack 502 of a physical resource 500 that can be utilized in accordance with various embodiments. Such a resource stack 502 can be used to provide an allocated environment for a user (or customer of a resource provider) having an operating system provisioned on the resource. In accordance with the illustrated embodiment, the resource stack 502 includes a number of hardware resources 504, such as one or more central processing units (CPUs) 512; solid state drives (SSDs) or other storage devices 510; a network interface card (NIC) 506, one or more peripheral devices (e.g., a graphics processing unit (GPU), etc.) 508, a BIOS implemented in flash memory 516, and a baseboard management controller (BMC) 514, and the like. In some embodiments, the hardware resources 504 reside on a single computing device (e.g. chassis). In other embodiments, the hardware resources can reside on multiple devices, racks, chassis, and the like. Running on top of the hardware resources 504, a virtual resource stack may include a virtualization layer such as a hypervisor 518 for a Xen-based implementation, a host domain 520, and potentially also one or more guest domains 522 capable of executing at least one application 532. The hypervisor 518, if utilized for a virtualized environment, can manage execution of the one or more guest operating systems and allow multiple instances of different operating systems to share the underlying hardware resources 504. Conventionally, hypervisors are installed on server hardware, with the function of running guest operating systems, where the guest operating systems themselves act as servers.

In accordance with an embodiment, a hypervisor 518 can host a number of domains (e.g., virtual machines), such as the host domain 520 and one or more guest domains 522. In one embodiment, the host domain 520 (e.g., the Dom-0) is the first domain created and helps virtualize hardware resources and manage all of the other domains running on the hypervisor 518. For example, the host domain 520 can manage the creating, destroying, migrating, saving, or restoring the one or more guest domains 522 (e.g., the Dom-U). In accordance with various embodiments, the hypervisor 518 can control access to the hardware resources such as the CPU, input/output (I/O) memory, and hypervisor memory.

A guest domain 522 can include one or more virtualized or para-virtualized drivers 530 and the host domain can include one or more backend device drivers 526. When the operating system (OS) kernel 528 in the guest domain 522 wants to invoke an I/O operation, the virtualized driver 530 may perform the operation by way of communicating with the backend device driver 526 in the host domain 520. When the guest driver 530 wants to initiate an I/O operation (e.g., to send out a network packet), a guest kernel component can identify which physical memory buffer contains the packet (or other data) and the guest driver 530 can either copy the memory buffer to a temporary storage location in the kernel for performing I/O or obtain a set of pointers to the memory pages that contain the packet(s). In at least one embodiment, these locations or pointers are provided to the backend driver 526 of the host kernel 524 which can obtain access to the data and communicate it directly to the hardware device, such as the NIC 506 for sending the packet over the network.

It should be noted that the resource stack 502 illustrated in FIG. 5 is only one possible example of a set of resources that is capable of providing a virtualized computing environment and that the various embodiments described herein are not necessarily limited to this particular resource stack. In some embodiments, the guest domain 522 may have substantially native or "bare metal" access to the NIC 506 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 514 can maintain a list of events that have occurred in the system, referred to herein as a system event log (SEL). In at least one embodiment, the BMC 514 can receive system event logs from the BIOS 516 on the host processor. The BIOS 516 can provide data for system events over an appropriate interface, such as an I²C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 518 can prevent the guest operating system, or guest domain 522, from sending such system event log data to the BMC 514. In the case of bare metal access without such a hypervisor, however, user instances can have the ability to send data for system event that spoof events from the BIOS 516. Such activity could lead to compromised bare metal instances being prematurely degraded due to fake system event data produced by the user OS.

In at least one embodiment, however, there will be portions of the physical resource 500 that will be inaccessible to the user OS. This can include, for example, at least a portion of BIOS memory 516. BIOS memory 516 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 516 at boot time, before a user OS is executing on the resource. Once the user OS is executing on the resource, that OS will be prevented from accessing that secret token in BIOS memory 516. In at least one embodiment, this secret token (or other stored secret) can be provided to the BMC 514 when adding system event log events, whereby the BMC 514 can confirm that the event is being sent by the BIOS 516 and not by the user OS.

Figure 6:
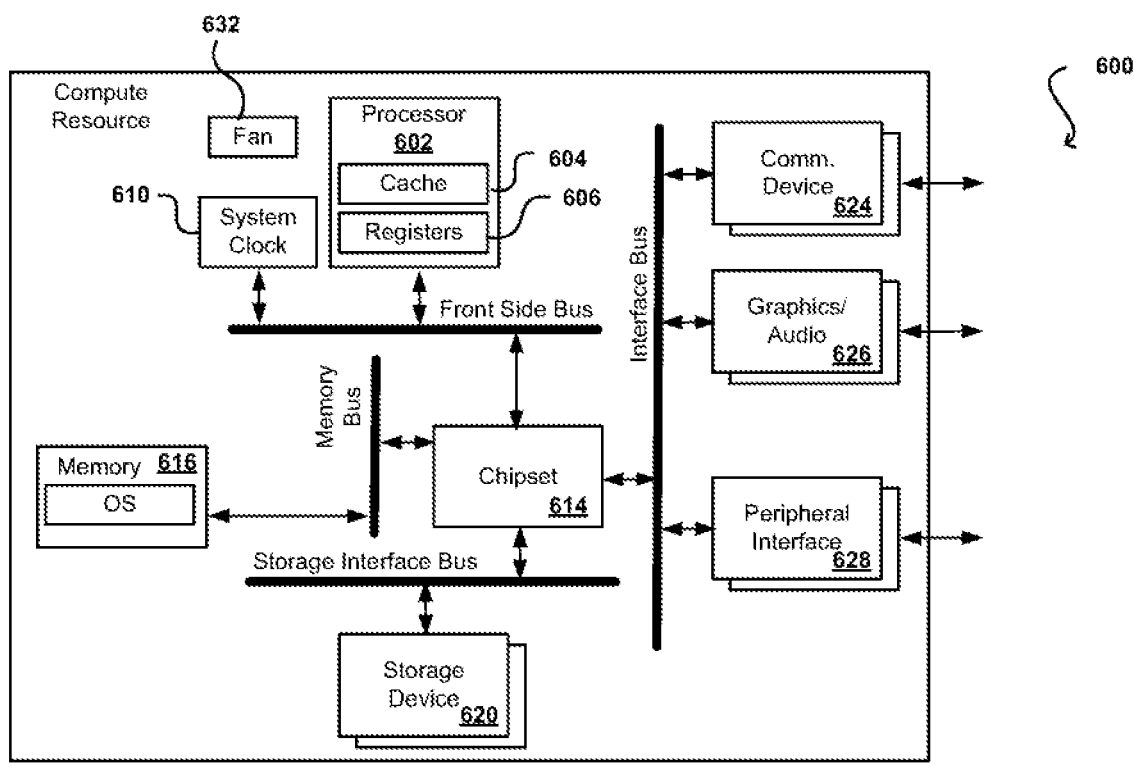
FIG. 6 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 6 illustrates components of an example computing resource 600 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 600 (e.g., a desktop or network server) will have one or more processors 602, such as central processing units (CPUs), graphics processing units (GPUs), and the like, that are electronically and/or communicatively coupled with various components using various buses, traces, and other such mechanisms. A processor 602 can include memory registers 606 and cache memory 604 for holding instructions, data, and the like. In this example, a chipset 614, which can include a northbridge and southbridge in some embodiments, can work with the various system buses to connect the processor 602 to components such as system memory 616, in the form or physical RAM or ROM, which can include the code for the operating system as well as various other instructions and data utilized for operation of the computing device. The computing device can also contain, or communicate with, one or more storage devices 620, such as hard drives, flash drives, optical storage, and the like, for persisting data and instructions similar, or in addition to, those stored in the processor and memory. The processor 602 can also communicate with various other components via the chipset 614 and an interface bus (or graphics bus, etc.), where those components can include communications devices 624 such as cellular modems or network cards, media components 626, such as graphics cards and audio components, and peripheral interfaces 670 for connecting peripheral devices, such as printers, keyboards, and the like. At least one cooling fan 672 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 602 can obtain data from physical memory 616, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 604 in at least some embodiments. The computing device 600 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 628, a communication device 624, a graphics or audio card 626, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 602 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O) adapter device is attached externally to the host device. In some embodiments, the I/O) adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The VO adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
intercepting, by a proxy agent in a customer environment, a request from a customer application to be processed by a resource in a service environment;
modifying, by the proxy agent, the request, previously directed to the resource in the service environment, to specify a service proxy and cause the request to be redirected to the service proxy in the service environment;
analyzing the request, received by the service proxy in the service environment, to determine access permitted for the request;
signing the request with one or more service credentials corresponding to the determined access and forwarding the request to the resource in the service environment;
receiving, from the resource by the service proxy in the service environment, a response to the request;

removing, by the service proxy, the one or more service credentials if associated with the response, and forwarding the response to the proxy agent in the customer environment; and redirecting the response, received by the proxy agent, to the customer application, wherein the customer application is able to process the response as if it had been received without any modification by the service proxy.

2. The computer-implemented method of claim 1, wherein the request includes one or more instructions for managing one or more aspects of a service supported, at least in part, by the resource in the service environment on behalf of the customer application.

3. The computer-implemented method of claim 1, wherein the request received by the service proxy is signed by one or more customer credentials, and wherein the service proxy is to remove the one or more customer credentials before signing the request with the one or more service credentials.

4. The computer-implemented method of claim 1, wherein the proxy agent is further to modify and perform remapping for the request before redirecting the request to the service proxy, and wherein the service proxy is further to modify and perform remapping for the response before redirecting the response to the customer application.

5. The computer-implemented method of claim 1, wherein the proxy agent and the service proxy enable the customer application to indirectly communicate with the resource in the service environment.

6. A computer-implemented method, comprising:
receiving, from a proxy agent in a remote environment by a service proxy in a resource provider environment, a request intended for a service endpoint in the resource provider environment, the request modified by the proxy agent to specify the service proxy and cause the request to be sent to the service proxy;
determining, by the service proxy, that the request has permission to access one or more resources in the resource provider environment that are associated with the service endpoint;
causing a service credential, corresponding to the permission, to be added to the request; and
transmitting the request from the service proxy to the service endpoint in the resource provider environment, wherein the one or more resources are enabled to process the request independent of a remote application, associated with the request, having the service credential needed to obtain the permission.

7. The computer-implemented method of claim 6, further comprising:
receiving, from the resource by the service proxy, a response to the request that includes the service credential;
removing the service credential from the response; and
transmitting the response from the service proxy to the proxy agent, wherein the proxy agent is enabled to forward the response to the remote application.

8. The computer-implemented method of claim 6, wherein the proxy agent is to redirect the request from the remote application to the service proxy, and wherein the remote application is enabled to process the request without information indicating that the request or the response were modified or redirected by the proxy agent or the service proxy.

9. The computer-implemented method of claim 6, further comprising:

providing a virtual container including the remote application and the proxy agent for hosting on a remote resource in the remote environment.

10. The computer-implemented method of claim 6, wherein the request includes one or more instructions for managing one or more aspects of a service supported, at least in part, by the resource in the resource provider environment on behalf of the remote application.

11. The computer-implemented method of claim 6, wherein the service proxy is associated with one or more cloud services hosted on one or more resources in the resource provider environment, and wherein the service proxy is enabled to determine scoping and access for the request depending, at least in part, upon a corresponding service of the one or more cloud services associated with the request.

12. The computer-implemented method of claim 6, wherein the service proxy is further to perform remapping for data in the request relating to resources in the remote environment or the resource provider environment.

13. The computer-implemented method of claim 6, wherein the request received by the service proxy is signed by one or more user credentials, and wherein the service proxy is to remove the one or more user credentials before signing the request with the service credentials.

14. The computer-implemented method of claim 13, wherein the service proxy is further to analyze content of the response and remove or modify any portion of the content that is to be prevented from being transmitted out of the resource provider environment.

15. The computer-implemented method of claim 6, wherein the remote environment includes one or more resources for hosting the remote application that are operated by an entity different from a provider of the resource provider environment.

16. A system, comprising:
at least one processor; and
memory including instructions that, when executed by the at least one processor, cause the system to:
receive, from a proxy agent in a remote environment by a service proxy in a resource provider environment, a request intended for a service endpoint in the resource provider environment, the request modified by the proxy agent to specify the service proxy and cause the request to be sent to the service proxy;
determine, by the service proxy, that the request has permission to access one or more resources in the resource provider environment that are associated with the service endpoint;
cause a service credential, corresponding to the permission, to be added to the request; and
transmit the request from the service proxy to the service endpoint in the resource provider environment, wherein the one or more resources are enabled to process the request independent of a remote application, associated with the request, having the service credential needed to obtain the permission.

17. The system of claim 16, wherein the instructions when executed further cause the system to:
receive, from the resource by the service proxy, a response to the request that includes the service credential;
remove the service credential from the response; and
transmit the response from the service proxy to the proxy agent, wherein the proxy agent is enabled to forward the response to the remote application.

18. The system of claim 16, wherein the proxy agent is to redirect the request from the remote application to the service proxy, and wherein the remote application is enabled to process the request without information indicating that the request or the response were modified or redirected by the proxy agent or the service proxy.

19. The system of claim 16, wherein the service proxy is associated with one or more cloud services hosted on one or more resources in the resource provider environment, and wherein the service proxy is enabled to determine scoping and access for the request depending, at least in part, upon a corresponding service of the one or more cloud services associated with the request.

20. The system of claim 16, wherein the request received by the service proxy is signed by one or more user credentials, and wherein the service proxy is to remove the one or more user credentials before signing the request with the one or more service credentials.

* * * * *